United States Patent
Yamamoto et al.

(10) Patent No.: US 11,169,023 B2
(45) Date of Patent: Nov. 9, 2021

(54) OPTICAL MEASURING DEVICE, MALFUNCTION DETERMINATION SYSTEM, MALFUNCTION DETERMINATION METHOD, AND A NON-TRANSITORY RECORDING MEDIUM STORING MALFUNCTION

(71) Applicant: KONICA MINOLTA, INC., Chiyoda-ku (JP)

(72) Inventors: Koji Yamamoto, Kawanishi (JP); Masahiko Sakimoto, Sakai (JP); Naoki Sagisaka, Tondabayashi (JP); Akihiro Okayama, Sennan-gun (JP); Satoshi Yokota, Toyonaka (JP); Norimasa Kubota, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 490 days.

(21) Appl. No.: 16/093,096

(22) PCT Filed: Apr. 10, 2017

(86) PCT No.: PCT/JP2017/014614
§ 371 (c)(1),
(2) Date: Oct. 11, 2018

(87) PCT Pub. No.: WO2017/179520
PCT Pub. Date: Oct. 19, 2017

(65) Prior Publication Data
US 2020/0326237 A1 Oct. 15, 2020

(30) Foreign Application Priority Data
Apr. 14, 2016 (JP) .............................. JP2016-080971

(51) Int. Cl.
*G01J 3/02* (2006.01)
*G01J 3/28* (2006.01)

(52) U.S. Cl.
CPC ........... *G01J 3/0275* (2013.01); *G01J 3/0264* (2013.01); *G01J 3/2823* (2013.01); *G01J 2003/2873* (2013.01)

(58) Field of Classification Search
CPC ...... G01J 3/0275; G01J 3/0264; G01J 3/2823; G01J 2003/2873; G01J 3/18; G01J 3/28;
(Continued)

(56) References Cited

U.S. PATENT DOCUMENTS 4,178,510 A * 12/1979 Wagner ................. A61B 6/032
378/51
4,551,800 A * 11/1985 Riederer ................. G06T 5/50
128/922

(Continued)

FOREIGN PATENT DOCUMENTS

JP     H 10-153545     6/1998
JP     H 10-307062     11/1998
(Continued)

OTHER PUBLICATIONS

International Search Report dated Jun. 27, 2017 issued in corresponding Application No. PCT/JP2017/014614.
(Continued)

*Primary Examiner* — Mohamed K Amara
(74) *Attorney, Agent, or Firm* — Cozen O'Connor

(57) ABSTRACT

An optical measuring device includes a light measurement unit, an acceleration sensor for detecting the acceleration of the optical measuring device, a storage for storing reference data obtained from the light measurement unit by measuring light from a reference object at a first timing and storing the acceleration detected by the acceleration sensor as history information, a first determination unit for determining whether the result of comparison between measurement data obtained from the light measurement unit by measuring light
(Continued)

from the reference object at a second timing later than the first timing and the reference data satisfies a first malfunction condition, a second determination unit for determining whether the acceleration included in the history information satisfies a second malfunction condition, and an output unit for outputting that the optical measuring device malfunctions when the first malfunction condition and the second malfunction condition are satisfied.

19 Claims, 13 Drawing Sheets

(58) Field of Classification Search
CPC ........ G01J 3/027; G01J 3/2803; G01J 3/0291; G01J 3/0297; G01J 3/50; A61B 1/045; A61B 1/051; A61B 5/7203; G02B 23/2484; G02B 23/2461
See application file for complete search history.

(56) References Cited

U.S. PATENT DOCUMENTS

| | | | | |
|---|---|---|---|---|
| 7,514,703 B2* | 4/2009 | Iwakiri | ................ | G03B 42/02 250/584 |
| 7,801,271 B2* | 9/2010 | Gertner | ................ | A61N 5/1037 378/65 |
| 7,899,232 B2* | 3/2011 | Gudmundson | ...... | G06K 9/6255 382/132 |
| 8,459,869 B2* | 6/2013 | Enomoto | ................ | A61B 6/586 378/207 |
| 8,506,558 B2* | 8/2013 | Gertner | ................ | A61N 5/1017 606/4 |
| 8,633,447 B2* | 1/2014 | Watanabe | ................ | H04N 5/32 250/370.09 |
| 8,953,744 B2* | 2/2015 | Watanabe | ................ | H04N 5/361 378/98.8 |
| 9,442,130 B2* | 9/2016 | Karr | ................ | G01P 15/0891 |
| 9,554,759 B2* | 1/2017 | Hawver | ................ | A61B 6/42 |
| 9,993,221 B2* | 6/2018 | Kim | ................ | A61B 6/06 |
| 10,470,662 B2* | 11/2019 | Lips | ................ | A61B 6/037 |
| 10,593,291 B2* | 3/2020 | Jia | ................ | G01J 3/505 |
| 2001/0020690 A1* | 9/2001 | Yasuda | ................ | G01T 1/2014 250/586 |
| 2003/0223540 A1* | 12/2003 | Hayashida | ................ | G01T 1/17 378/98.8 |
| 2004/0062342 A1* | 4/2004 | Cahill | ................ | G01N 23/046 378/4 |
| 2006/0002631 A1* | 1/2006 | Fu | ................ | G06K 9/3233 382/294 |
| 2006/0239415 A1* | 10/2006 | Liu | ................ | A61B 6/583 378/207 |
| 2012/0201357 A1* | 8/2012 | Watanabe | ................ | H04N 5/232 378/114 |
| 2013/0138226 A1* | 5/2013 | Bleier | ................ | G01J 3/45 700/66 |
| 2013/0176401 A1* | 7/2013 | Monari | ................ | H04N 13/20 348/47 |
| 2014/0367579 A1* | 12/2014 | Otsuka | ................ | G01N 21/17 250/372 |
| 2016/0077124 A1* | 3/2016 | Karr | ................ | G01P 15/0891 250/363.03 |
| 2016/0112654 A1* | 4/2016 | Seo | ................ | G01J 3/463 348/333.12 |
| 2016/0216156 A1* | 7/2016 | Peng | ................ | G01J 3/501 |

FOREIGN PATENT DOCUMENTS

| | | |
|---|---|---|
| JP | 2011-67334 | 4/2011 |
| JP | 2012-45242 | 3/2012 |

OTHER PUBLICATIONS

Written Opinion dated Jun. 27, 2017 issued in corresponding Application No. PCT/JP2017/014614.
International Search Report dated Jun. 15, 2017 issued in corresponding Application No. PCT/JP2017/014614.
Written Opinion dated Jun. 15, 2017 issued in corresponding Application No. PCT/JP2017/014614.

* cited by examiner

FIG.7
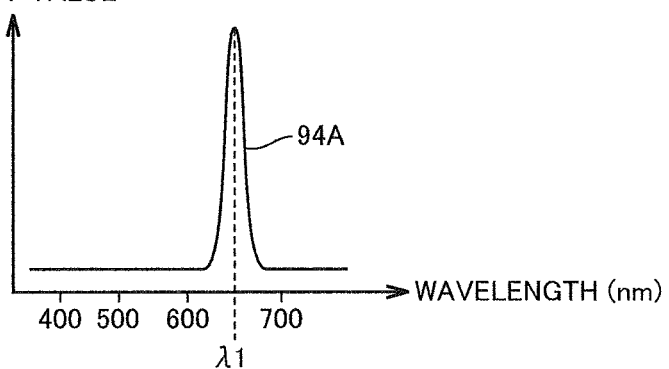
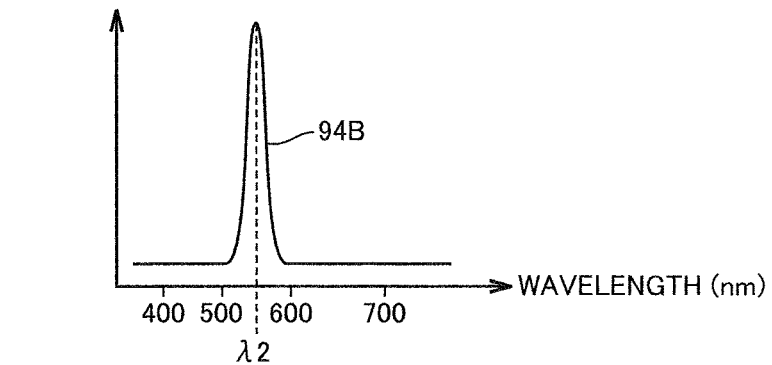

FIG.8
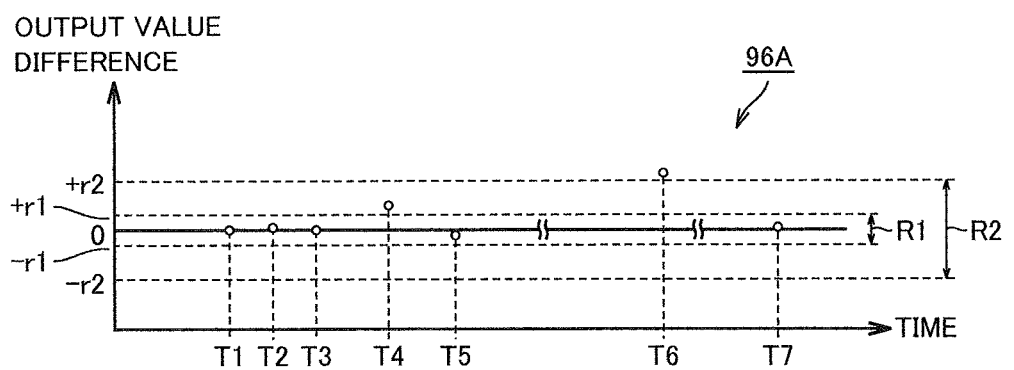
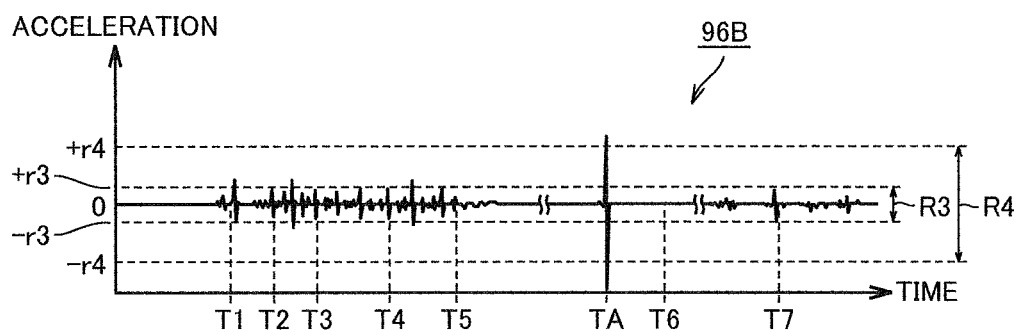

OPTICAL MEASURING DEVICE, MALFUNCTION DETERMINATION SYSTEM, MALFUNCTION DETERMINATION METHOD, AND A NON-TRANSITORY RECORDING MEDIUM STORING MALFUNCTION

RELATED APPLICATIONS

This is a U.S. National Phase Application under 35 USC 371 of International Application PCT/JP2017/014614 filed on Apr. 10, 2017.

This application claims the priority of Japanese application no. 2016-080971 filed Apr. 8, 2016 Apr. 14, 2016, the entire content of which is hereby incorporated by reference.

FIELD OF THE INVENTION

Background

Technological Field

The present disclosure relates to an optical measuring device and more specifically to a technique for determining whether there is a malfunction of an optical measuring device.

Description of the Related Art

Optical measuring devices capable of measuring colors of measurement targets have been widely used. The optical measuring device malfunctions for various reasons including product lifetime and dropping. The malfunction of the optical measuring device reduces the measurement accuracy. To prevent this, techniques for detecting malfunction of optical measuring devices have been developed.

For techniques for determining whether there is a malfunction, Japanese Laid-Open Patent Publication No. H10-307062 (PTL 1) discloses a spectrometric system capable of notifying the operator of the detail of a malfunction. Japanese Laid-Open Patent Publication No. H10-153545 (PTL 2) discloses a spectroscopic analyzer capable of giving a notice of abnormality.

The spectrometric system disclosed in Japanese Laid-Open Patent Publication No. H10-307062 determines that the spectrometric system is failed when the signal intensity obtained by measuring a measurement target is lower than a prescribed value. However, the spectrometric system is not always failed even when the signal intensity is lower than a prescribed value.

The spectroscopic analyzer disclosed in Japanese Laid-Open Patent Publication No. H10-153545 has a vibration sensor. The spectroscopic analyzer determines that the spectroscopic analyzer is failed when the output value from the vibration sensor exceeds a prescribed value. However, the spectroscopic analyzer is not always failed even when the output value from the vibration sensor exceeds a prescribed value.

There is a demand for an optical measuring device capable of determining whether there is a malfunction more accurately than conventional examples.

Patent Literature

PTL 1: Japanese Laid-Open Patent Publication No. H10-307062

PTL 2: Japanese Laid-Open Patent Publication No. H10-153545

SUMMARY

An optical measuring device includes a light measurement unit, a sensor to detect a magnitude of vibration of the optical measuring device, a storage to store first measurement data obtained from the light measurement unit by measuring light from a reference object at a first timing and store the magnitude of vibration detected by the sensor as history information, a first determination unit configured to determine whether a result of comparison between second measurement data obtained from the light measurement unit by measuring light from the reference object at a second timing later than the first timing and the first measurement data satisfies a predetermined first condition, a second determination unit configured to determine whether the magnitude of vibration included in the history information satisfies a predetermined second condition, and an output unit configured to output that the optical measuring device malfunctions when the first determination unit determines that the first condition is satisfied and the second determination unit determines that the second condition is satisfied.

According to another aspect, a malfunction determination system includes an optical measuring device and a communication terminal capable of communicating with the optical measuring device. The optical measuring device includes a light measurement unit, a sensor to detect a magnitude of vibration of the optical measuring device, a storage to store first measurement data obtained from the light measurement unit by measuring light from a reference object at a first timing and store the magnitude of vibration detected by the sensor as history information, and a first communication interface configured to transmit second measurement data obtained from the light measurement unit by measuring light from the reference object at a second timing later than the first timing, the first measurement data, and the history information to the communication terminal. The communication terminal includes a second communication interface configured to receive the first measurement data, the second measurement data, and the history information, a first determination unit configured to determine whether a result of comparison between the first measurement data and the second measurement data satisfies a predetermined first condition, a second determination unit configured to determine whether the magnitude of vibration included in the history information satisfies a predetermined second condition, and an output unit configured to output that the optical measuring device malfunctions when the first determination unit determines that the first condition is satisfied and the second determination unit determines that the second condition is satisfied.

According to yet another aspect, a malfunction determination method for an optical measuring device is provided. The optical measuring device includes a light measurement unit, a sensor to detect a magnitude of vibration of the optical measuring device, and a storage to store first measurement data obtained from the light measurement unit by measuring light from a reference object at a first timing and store the magnitude of vibration detected by the sensor as history information. The malfunction determination method includes: determining whether a result of comparison between second measurement data obtained from the light measurement unit by measuring light from the reference object at a second timing later than the first timing and the first measurement data satisfies a predetermined first condition; determining whether the magnitude of vibration included in the history information satisfies a predetermined second condition; and outputting that the optical measuring device malfunctions when the first condition is satisfied and the second condition is satisfied.

According to yet another aspect, a non-transitory recording medium storing a malfunction determination program for an optical measuring device is provided. The optical measuring device includes a light measurement unit, a sensor to detect a magnitude of vibration of the optical measuring device, and a storage to store first measurement data obtained from the light measurement unit by measuring light from a reference object at a first timing and store the magnitude of vibration detected by the sensor as history information. The malfunction determination program causes the optical measuring device to perform: determining whether a result of comparison between second measurement data obtained from the light measurement unit by measuring light from the reference object at a second timing later than the first timing and the first measurement data satisfies a predetermined first condition; determining whether the magnitude of vibration included in the history information satisfies a predetermined second condition; and outputting that the optical measuring device malfunctions when the first condition is satisfied and the second condition is satisfied.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram for explaining a calibration process by a calibration unit.

FIG. 8 is a diagram illustrating temporal change of the magnitude of difference between reference data and measurement data and temporal change of the acceleration of the optical measuring device.

DETAILED DESCRIPTION OF EMBODIMENTS

Embodiments according to the present invention will be described below with reference to the drawings. In the following description, the same parts and components are denoted by the same reference signs. Their names and functions are also the same. A description thereof therefore will not be repeated. Embodiments and modifications described below may be selectively combined as appropriate.

First Embodiment

Overview of Optical Measuring Device 100

Figure 1:
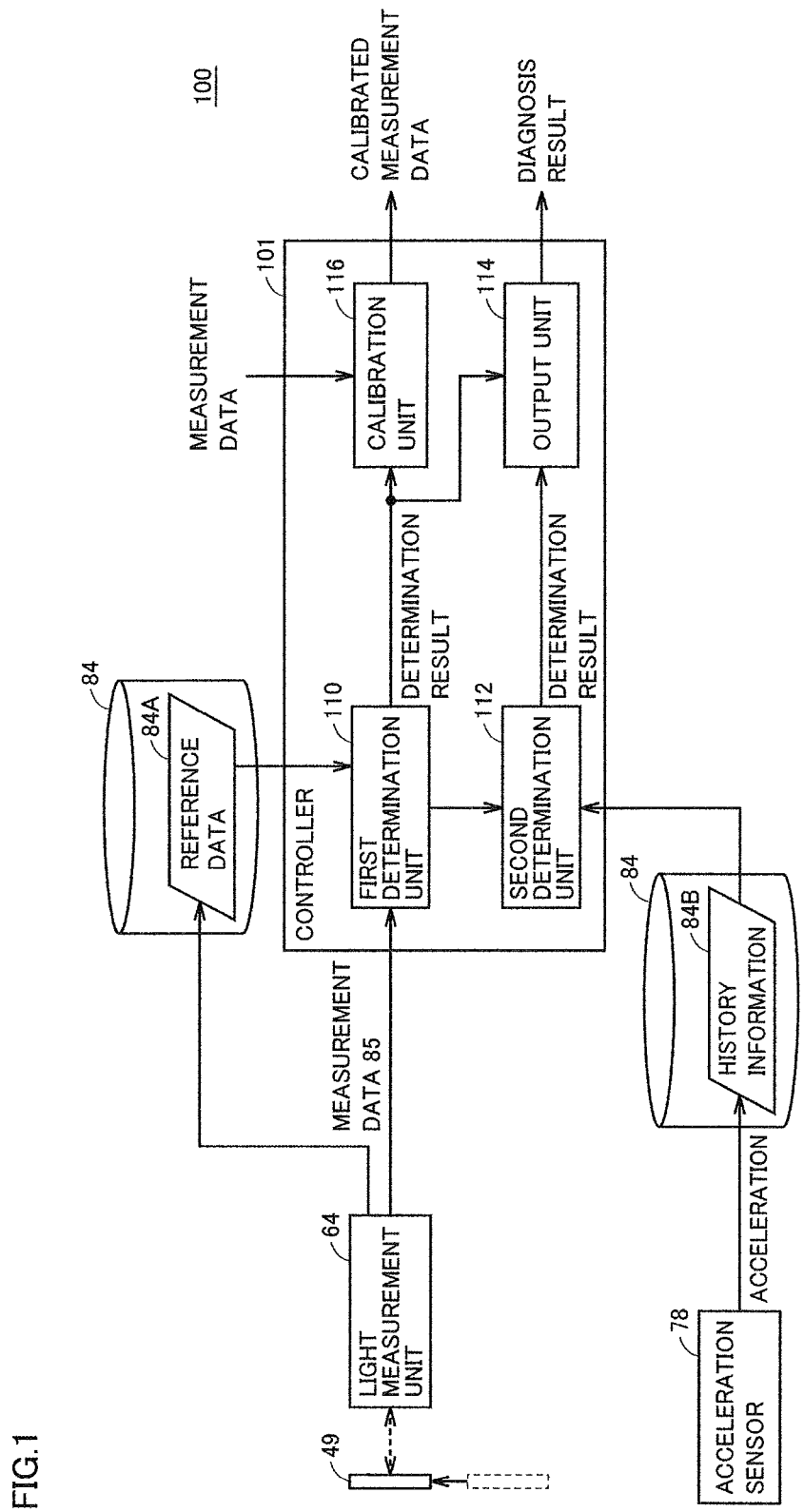
FIG. 1 is a diagram showing an exemplary configuration for implementing a malfunction determination process by an optical measuring device.

Referring to FIG. 1, an optical measuring device 100 according to the present embodiment will be described. FIG. 1 is a diagram showing an exemplary configuration for implementing a malfunction determination process by optical measuring device 100.

As shown in FIG. 1, optical measuring device 100 includes, as an example of the hardware configuration, a reference object 49, a light measurement unit 64, an acceleration sensor 78, a storage 84, and a controller 101. Controller 101 includes, as an example of the functional configuration, a first determination unit 110, a second determination unit 112, an output unit 114, and a calibration unit 116.

Light measurement unit 64 measures light from a measurement target to output measurement data 85. Measurement data 85 represents the spectral characteristics (color) of the measurement target. As an example, measurement data 85 represents the light intensity for each wavelength. That is, measurement data 85 represents the spectrum of reflected light from the measurement target (which hereinafter may be referred to as "measurement light").

Acceleration sensor 78 (sensor) detects the magnitude of vibration of optical measuring device 100. The magnitude of vibration is represented by, for example, the acceleration of optical measuring device 100. In the following description, acceleration is used as an index representing the vibration of optical measuring device 100. However, the magnitude of vibration may be represented by an index other than acceleration. For example, the magnitude of vibration may be represented by the velocity of optical measuring device 100. In this case, a velocity sensor (not shown) is provided in place of acceleration sensor 78.

Storage 84 stores reference data 84A obtained by light measurement unit 64 measuring light from reference object 49 at a predetermined timing (first timing). Reference data 84A is stored in advance. Reference object 49 is, for example, a plate of a predetermined color (for example, white).

Storage 84 stores the acceleration detected by acceleration sensor 78 as history information 84B. As an example, the acceleration of optical measuring device 100 is detected at certain time intervals, and the detected acceleration is associated with the detection time and then written in history information 84B. In history information 84B, all of the detected accelerations may be written or only the accelerations exceeding a prescribed value may be written.

First determination unit 110 determines whether there is a malfunction of optical measuring device 100 based on the measurement data of reference object 49. More specifically, first determination unit 110 acquires, from light measurement unit 64, measurement data 85 obtained by measuring light from reference object 49 at a timing (second timing) later than the measurement timing of reference data 84A. Reference object 49 is configured to be able to be driven. Preferably, reference object 49 is driven into a field of view of light measurement unit 64 at the time of malfunction determination and driven to the outside of the field of view of light measurement unit 64 at any other times. When reference object 49 is driven into the field of view of light measurement unit 64, light measurement unit 64 captures an image of reference object 49. As a result, measurement data 85 is obtained. First determination unit 110 determines whether the result of comparison between reference data 84A and measurement data 85 satisfies a predetermined first malfunction condition (first condition). The detail of the first malfunction condition will be described later.

Second determination unit 112 determines whether there is a malfunction of optical measuring device 100 based on the acceleration. More specifically, second determination unit 112 determines whether the acceleration included in history information 84B satisfies a predetermined second malfunction condition (second condition). As an example, the second malfunction condition is satisfied when the acceleration included in history information 84B falls outside a predetermined reference range. The detail of the second malfunction condition will be described later.

Output unit 114 outputs that optical measuring device 100 malfunctions when first determination unit 110 determines that the first malfunction condition is satisfied and second determination unit 112 determines that the second malfunction condition is satisfied. The result of diagnosis of optical measuring device 100 may be output in any manner The diagnosis result may be displayed as a message on display unit 80 (see FIG. 2) of optical measuring device 100 or may be output by sound.

As described above, optical measuring device 100 determines that optical measuring device 100 malfunctions when both of the first malfunction condition and the second malfunction condition are satisfied. With the first malfunction condition, it is determined whether measurement data 85 deviates from reference data 84A. With the second malfunction condition, it is determined whether optical measuring device 100 received a significant shock in the past. Whether there is a malfunction of optical measuring device 100 is determined more accurately than conventional examples by determining the malfunction of optical measuring device 100 based on both the first malfunction condition and the second malfunction condition.

The degree of malfunction that can be detected by optical measuring device 100 is set as desired. As an example, optical measuring device 100 can detect a malfunction caused by a change over time, such as product life, and a malfunction caused by dropping. The degree of malfunction caused by a change over time is often smaller than the degree of malfunction caused by dropping. If the degree of malfunction is small, the malfunction is eliminated by a calibration process on software by calibration unit 116. The detail of the calibration process will be described later. On the other hand, the degree of malfunction caused by dropping is often larger than the degree of malfunction caused by a change over time. When the degree of malfunction is large, optical measuring device 100 requires repair.

Internal Configuration of Optical Measuring Device 100

Figure 2:
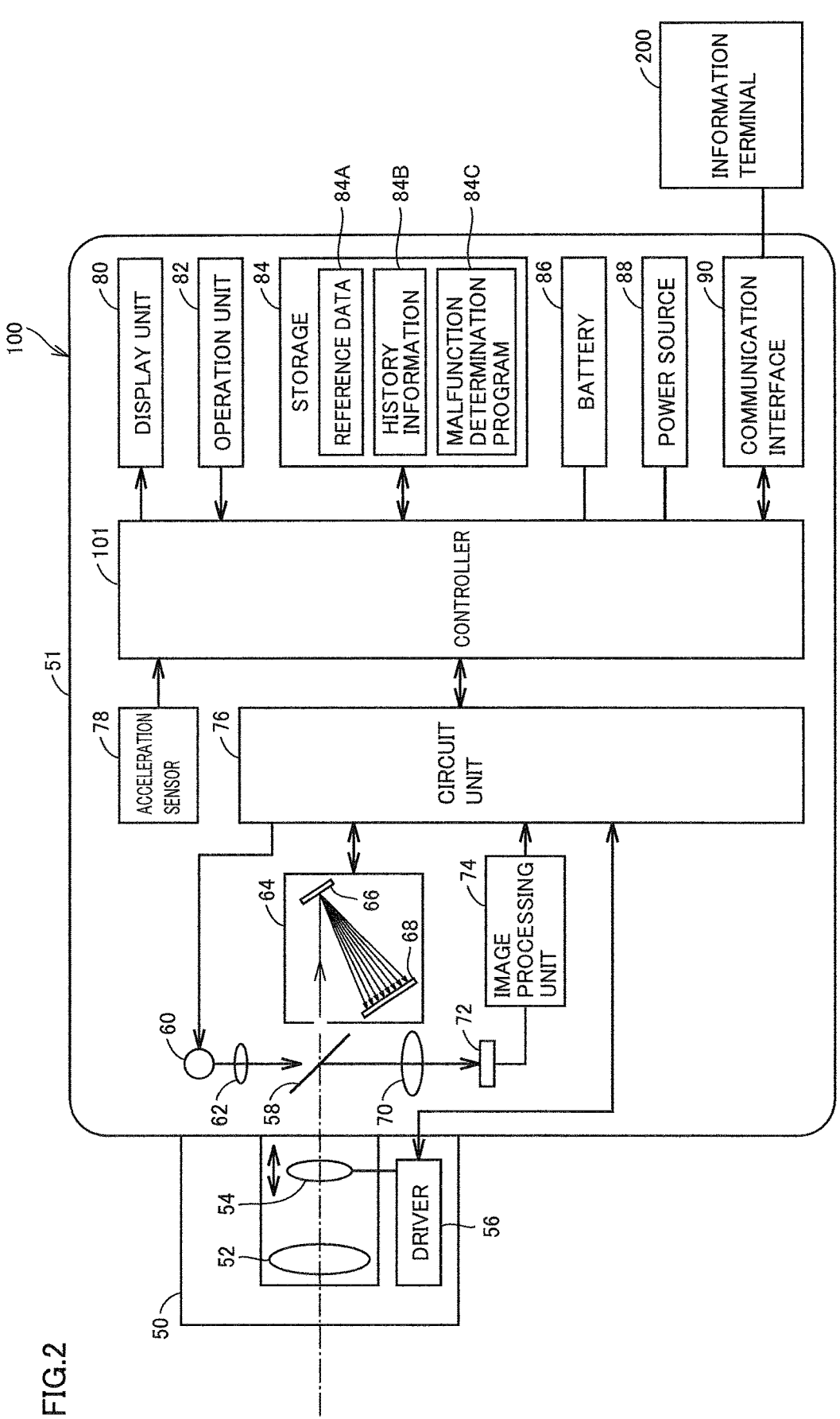
FIG. 2 is a diagram showing an exemplary internal configuration of the optical measuring device.
Figure 3:
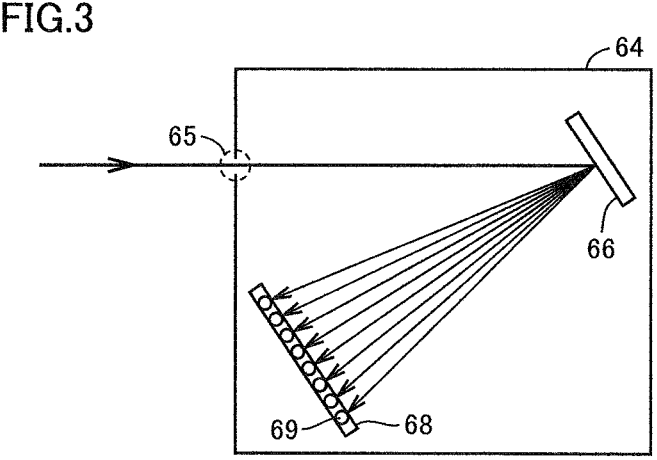
FIG. 3 illustrates dispersion of measurement light into separate wavelengths.
Figure 4:
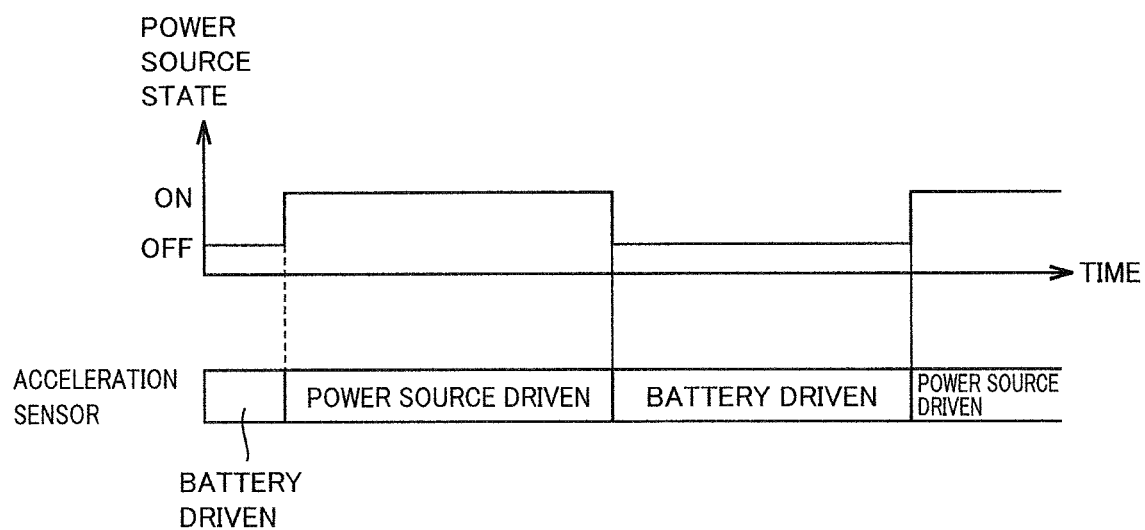
FIG. 4 is a diagram showing the relation between the state of a power source of the optical measuring device and the supply source of electric power to an acceleration sensor.

Referring to FIG. 2 to FIG. 4, the internal configuration of optical measuring device 100 will be described. FIG. 2 is a diagram showing an exemplary internal configuration of optical measuring device 100.

As shown in FIG. 2, optical measuring device 100 includes a lens unit 50 and a housing 51. Lens unit 50 includes a lens 52, a lens 54, and a driver 56.

Lens 52 is, for example, an objective lens. Lens 52 forms an image of reflected light from the measurement target. Lens 54 is, for example, a focus lens. Lens 54 is a lens for adjusting the focal point. Driver 56 drives lens 54 in the optical axis direction of lens 54 in accordance with a control signal from controller 101.

Housing 51 contains a half mirror 58, a light source 60, a lens 62, a light measurement unit 64 (spectroscopic unit), a lens 70, a light-receiving sensor 72, an image processing unit 74, a circuit unit 76, an acceleration sensor 78, a display unit 80, an operation unit 82, a storage 84, a battery 86, a power source 88, a communication interface 90, and a controller 101.

Half mirror 58 disperses measurement light passing through lens 52 and lens 54. Part of measurement light passes through half mirror 58 to be guided to light measurement unit 64. The rest of measurement light is reflected by half mirror 58 to be guided to light-receiving sensor 72.

Light source 60 emits light in a prescribed bandwidth. Light source 60 is, for example, a lamp such as a xenon lamp or an LED (Light Emitting Diode). Light source 60 turns on or turns off in accordance with a control signal from circuit unit 76. Light emitted from light source 60 passes through lens 62 and is guided by half mirror 58 to light measurement unit 64.

Light measurement unit 64 includes a diffraction grating 66 (grating) and a light-receiving sensor 68. The housing of light measurement unit 64 has an opening 65. Measurement light passing through half mirror 58 passes through opening 65 and reaches diffraction grating 66. Diffraction grating 66 disperses the measurement light passing through opening 65 into separate wavelengths. FIG. 3 illustrates dispersion of measurement light into separate wavelengths. The dispersed measurement light reaches light-receiving sensor 68.

Light-receiving sensor 68 is, for example, a line sensor. Light-receiving sensor 68 includes a plurality of light-receiving elements 69 arranged linearly. Each light-receiving element 69 receives measurement light at the corresponding wavelength, photoelectrically converts the measurement light into an electrical signal, and outputs the electrical signal to circuit unit 76. Circuit unit 76 converts the electrical signal output from each light-receiving element 69 into a digital signal (voltage value) and calculates the light intensity of measurement light for each wavelength, based on the digital signal. As a result, a spectrum is obtained. The spectrum is output to controller 101. Preferably, the spectrum is processed such that fluctuations of light source 60 and variations in sensitivity of the sensors are cancelled before being output to controller 101.

Light-receiving sensor 72 is, for example, a two-dimensional image sensor such as a CCD (Charge Coupled Device) or a C-MOS (Complementary Metal Oxide Semiconductor). Light-receiving sensor 72 receives the measurement light passing through lens 70 and generates an image representing the measurement target. More specifically, light-receiving sensor 72 photoelectrically converts the measurement light into an electrical signal and outputs the electrical signal to image processing unit 74. Image processing unit 74 converts the electrical signal obtained from the light-receiving sensor 72 into a digital signal (voltage value) and generates an image representing the measurement target based on the digital signal. The generated image may be a monochrome image or a color image. The color image is composed of, for example, a R image representing a red component of the measurement target, a G image representing a green component of the measurement target, and a B image representing a blue component of the measurement target.

Acceleration sensor 78 detects the acceleration of optical measuring device 100. The acceleration detected by acceleration sensor 78 is associated with the detection time and written in history information 84B. All the detected accelerations may be written in history information 84B or only the acceleration exceeding a predetermined value may be written in history information 84B. Acceleration sensor 78 is supplied with electric power from one of battery 86 and power source 88. FIG. 4 is a diagram showing the relation between the state of power source 88 of optical measuring device 100 and the supply source of electric power to acceleration sensor 78. As shown in FIG. 4, when power source 88 is off, acceleration sensor 78 is supplied with electric power from battery 86. On the other hand, when power source 88 is on, acceleration sensor 78 is supplied with electric power from power source 88.

Display unit 80 is, for example, an LCD (Liquid Crystal Display), an organic EL (Electro Luminescence) display, or any other display device. Display unit 80 displays an image generated by image processing unit 74 in real time, in accordance with a control signal from controller 101. That is, display unit 80 functions as a viewfinder. Display unit 80 also displays the measurement result of the measurement target, the setting screen for optical measuring device 100, and the like. Preferably, display unit 80 includes a display and a touch panel. The display and the touch panel are superimposed on each other so that display unit 80 accepts an operation on optical measuring device 100 as a touch operation.

Operation unit 82 accepts an operation on optical measuring device 100. As an example, operation unit 82 includes a power source button, a measurement start button, a measurement mode select button, and a setting button (for example, cross button, up/down key). Based on the power source button being pressed, power source 88 supplies electric power to each unit (for example, acceleration sensor 78, controller 101, etc.) in optical measuring device 100.

Storage 84 is, for example, a storage medium such as a ROM (Read Only Memory), a RAM (Random Access Memory), or a hard disk. As an example, storage 84 stores the above-noted reference data 84A, the above-noted history information 84B, and a malfunction determination program 84C of optical measuring device 100.

Malfunction determination program 84C may not be a single program but may be built in part of any given program. In this case, the control process according to the present embodiment is implemented through cooperation with the given program. Such a program that does not include part of modules does not depart from the spirit of malfunction determination program 84C according to the present embodiment. Part or all of the functions provided by malfunction determination program 84C may be implemented by dedicated hardware. Alternatively, optical measuring device 100 may be configured in the form of cloud service such that at least one server executes part of the processing of malfunction determination program 84C.

Communication interface 90 implements the communication between optical measuring device 100 and communication terminal 200. Communication terminal 200 is, for example, a PC (Personal Computer) or a server. In an aspect, communication interface 90 is connected with an antenna (not shown), and the communication between optical measuring device 100 and communication terminal 200 is implemented by wireless communication through the antenna. Examples of the standards of the wireless communication include Wifi direct, Bluetooth (registered trademark), and ZigBee. In another aspect, communication interface 90 is a USB port, and a USB cable is connected to the USB port. Optical measuring device 100 and communication terminal 200 are connected with each other through a USB cable, and the communication between optical measuring device 100 and communication terminal 200 is implemented by wired communication through a USB cable.

Controller 101 controls optical measuring device 100. Controller 101 is configured with, for example, at least one integrated circuit. The integrated circuit is configured with, for example, at least one CPU (Central Processing Unit), at least one ASIC (Application Specific Integrated Circuit), at least one FPGA (Field Programmable Gate Array), or a combination thereof.

First Malfunction Condition

As described above, optical measuring device 100 determines that optical measuring device 100 malfunctions when both of the first malfunction condition and the second malfunction condition are satisfied.

Figure 5:
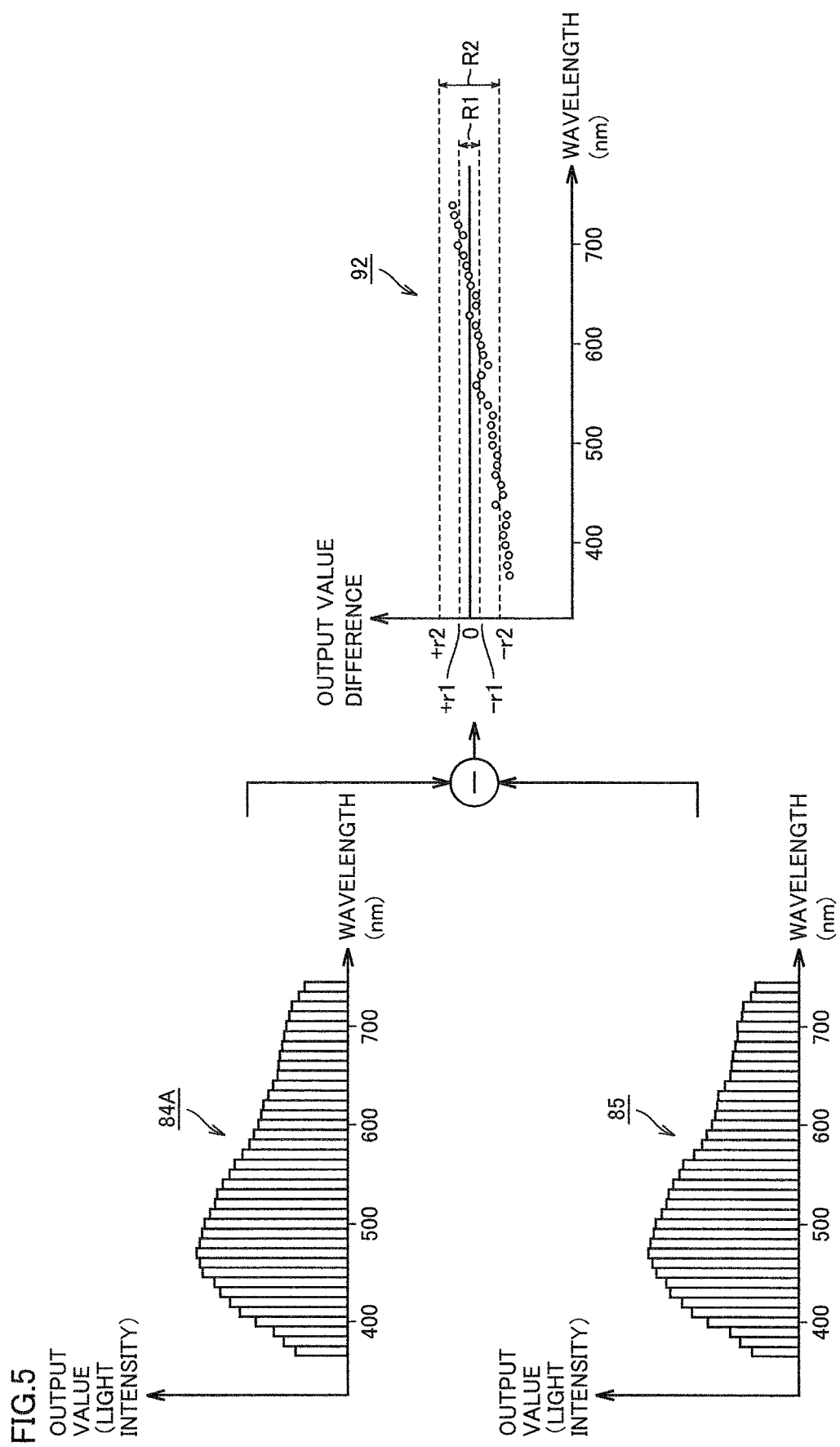
FIG. 5 is a diagram showing a comparison process between reference data and measurement data.

Referring to FIG. 5, the first malfunction condition will be described below. FIG. 5 is a diagram showing a comparison process between reference data 84A and measurement data 85.

Reference data 84A is data obtained by measuring light from reference object 49 (see FIG. 1) when optical measuring device 100 does not malfunction. Reference data 84A is stored in advance in optical measuring device 100. Reference data 84A represents the spectrum of measurement light from reference object 49. More specifically, the horizontal axis of reference data 84A represents the wavelength of measurement light. The horizontal axis of reference data 84A may represent the identification number (arrangement position) of light-receiving element 69 (see FIG. 3) arranged corresponding to the wavelength. The vertical axis of reference data 84A represents light intensity.

Measurement data 85 is data obtained by measuring light from reference object 49 later than the light measurement timing of reference data 84A. Similar to reference data 84A, measurement data 85 represents the spectrum of reflected light from reference object 49.

The above-noted first determination unit 110 (see FIG. 1) compares reference data 84A with measurement data 85 and determines whether the result of comparison satisfies the first malfunction condition. More specifically, first determination unit 110 subtracts at least one of reference data 84A and measurement data 85 from the other. Here, first determination unit 110 obtains the difference between light intensities at the same wavelength. As a result, differential data 92 is obtained. The first malfunction condition is satisfied when the magnitude of difference between reference data 84A (first measurement data) and measurement data 85 (second measurement data) falls outside a predetermined range R1 (first range).

Range R1 is defined by an upper limit value "+r1" and a lower limit value "−r1". Range R1 may be defined at least one of the upper limit value "+r1" and the lower limit value "−r1". Range R1 may be preset or may be set by the user.

In an aspect, the first malfunction condition is satisfied when at least one of the differential values included in differential data 92 falls outside range R1. In the example in FIG. 5, since at least one of differential values included in differential data 92 falls outside range R1, the first malfunction condition is satisfied. In another aspect, the first malfunction condition is satisfied when the average value of the differential values included in differential data 92 falls outside range R1.

The first malfunction condition being satisfied suggests that light incident on light measurement unit 64 deviates from the reference. Alternatively, this suggests that the positional relation between diffraction grating 66 (see FIG. 3) and light-receiving sensor 68 is shifted. Alternatively, this suggests that the environment such as temperature has changed.

Second Malfunction Condition

Figure 6:
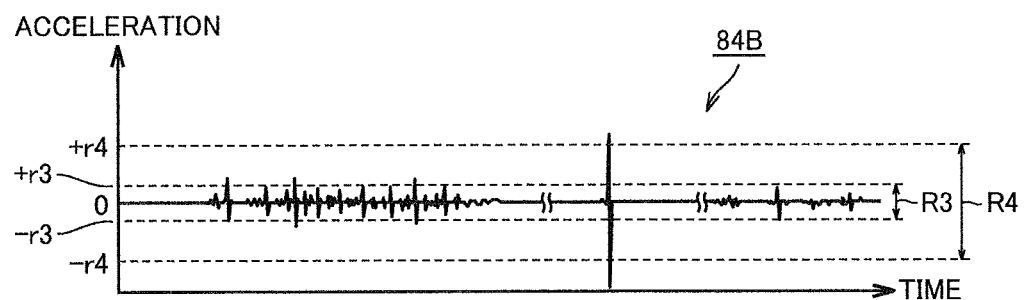
FIG. 6 is a diagram showing an example of history information.

Referring to FIG. 6, the second malfunction condition will be described. FIG. 6 is a diagram showing an example of history information 84B.

The above-noted second determination unit 112 (see FIG. 1) determines whether the acceleration included in history information 84B satisfies the second malfunction condition. In an aspect, the second malfunction condition is satisfied when the acceleration included in history information 84B falls outside a predetermined range R4. Preferably, the second malfunction condition is satisfied when at least one of the accelerations included in history information 84B falls outside range R4.

Range R4 is defined by an upper limit value "+r4" and a lower limit value "−r4". Range R4 may be defined at least one of the upper limit value "+r4" and the lower limit value "−r4". The upper limit value "+r4" and the lower limit value "−r4" may be preset or may be set as desired by the user.

Second determination unit 112 need not refer to all the accelerations included in history information 84B in order to determine whether the second malfunction condition is satisfied. As an example, second determination unit 112 specifies the acceleration detected from the light measurement timing of reference data 84A (see FIG. 5) to the light measurement timing of measurement data 85 (see FIG. 5), from among the accelerations defined in history information 84B. Second determination unit 112 determines that the second malfunction condition is satisfied when the specified acceleration falls outside range R4. Since the accelerations used for determination of the second malfunction condition are reduced, the time taken for the determination process in second determination unit 112 is reduced.

In another aspect, the second malfunction condition is satisfied when the sum of accelerations included in history information 84B falls outside a predetermined reference range. This enables detection of a malfunction caused by small shocks given on optical measuring device 100 many times.

Second determination unit 112 need not sum up all the accelerations included in history information 84B. As an example, second determination unit 112 specifies the accelerations falling outside range R3 from among accelerations defined in history information 84B and, if the sum of the specified accelerations falls outside the reference range, determines that the second malfunction condition is satisfied. The small shocks defined by range R3 include vibration produced when the user brings the optical measuring device into contact with a measurement target and vibration caused by hand shaking.

Range R3 is defined by an upper limit value "+r3" and a lower limit value "−r3". Range R3 may be defined by at least one of the upper limit value "+r3" and the lower limit value "−r3". The lower limit value "−r3" of range R3 is greater than the lower limit value "−r4" of range R4. The upper limit value "+r3" of range R3 is smaller than the upper limit value "+r4" of range R4. The upper limit value "+r3" and the lower limit value "−r3" may be preset or may be set as desired by the user.

In another aspect, second determination unit 112 counts the number of accelerations falling outside range R3, of the accelerations included in history information 84B, and determines that the second malfunction condition is satisfied when the count exceeds a prescribed number.

Output Unit 114

Referring to FIG. 5 and FIG. 6 again, the above-noted output unit 114 (see FIG. 1) will be described.

Optical measuring device 100 determines that optical measuring device 100 malfunctions when both of the first malfunction condition and the second malfunction condition are satisfied. When it is determined that optical measuring device 100 malfunctions, output unit 114 outputs that optical measuring device 100 malfunctions. Here, output unit 114 changes the content of output depending on the degree of malfunction of optical measuring device 100.

As an example, when the degree of malfunction is so small that the malfunction can be eliminated by a calibration process described later, output unit 114 prompts the user to execute a calibration process. When the degree of malfunction is so large that the malfunction cannot be eliminated by a calibration process, output unit 114 prompts the user to have optical measuring device 100 repaired.

The degree of malfunction of optical measuring device 100 is determined based on range R1 and range R2. Range R1 is defined by the upper limit value "+r1" and the lower limit value "−r1". Range R2 is defined by the upper limit value "+r2" and the lower limit value "−r2". The upper limit value "+r2" of range R2 is greater than the upper limit value "+r1" of range R1. The lower limit value "−r2" of range R2 is smaller than the lower limit value "−r1" of range R1. The range R1 may be defined by at least one of the upper limit value "+r1" and the lower limit value "−r1". Range R2 may be defined by at least one of the upper limit value "+r2" and the lower limit value "−r2". Range R1 and range R2 may be preset or may be set by the user.

When the magnitude of difference between reference data 84A and measurement data 85 falls outside range R2, output unit 114 outputs that optical measuring device 100 requires repair.

Here, the second malfunction condition also should be satisfied. That optical measuring device 100 requires repair may be displayed as a message on display unit 80 (see FIG. 2) or may be output by sound. When optical measuring device 100 requires repair, the use of optical measuring device 100 may be prohibited.

When the magnitude of difference between reference data 84A and measurement data 85 falls outside range R1 and within range R2 outside of range R1, output unit 114 outputs that a calibration process for the measurement data output from light measurement unit 64 (see FIG. 2) is necessary. The calibration process will be described later. That the calibration process is necessary may be displayed as a message on display unit 80 or output by sound. Upon accepting a permission to execute the calibration process from the user, optical measuring device 100 executes the calibration process as described later.

When the magnitude of difference between reference data 84A and measurement data 85 falls within range R1, output unit 114 outputs that optical measuring device 100 is normal. This may be displayed as a message on display unit 80 or output by sound.

Calibration Unit 116

Referring to FIG. 7, the above-noted calibration unit 116 (see FIG. 1) will be described. FIG. 7 is a diagram for explaining the calibration process by calibration unit 116.

When the degree of malfunction is so small that the malfunction can be eliminated by a calibration process for measurement data, calibration unit 116 calibrates the measurement data obtained from light measurement unit 64 (see FIG. 1) and outputs the calibrated measurement data.

As an example, light source 60 (see FIG. 2) is used in the calibration process. Optical measuring device 100 turns on light source 60 at a predetermined timing (third timing) to measure light from light source 60. Light source 60 emits light of wavelength λ1 in a prescribed band. Reference data 94A (third measurement data) is thus obtained. Since light source 60 outputs light of wavelength λ1, the light intensity in reference data 94A is largest at wavelength λ1. Reference data 94A is stored in advance, for example, in storage 84 (see FIG. 1).

Optical measuring device 100 turns on light source 60 at a timing (fourth timing) later than the measurement timing of reference data 94A and measures light from light source 60. Measurement data 94B (fourth measurement data) is thus obtained. When the position of the optical system is shifted, the light intensity in measurement data 94B is largest at wavelength λ2 although light source 60 emits light of wavelength λ1. That is, measurement data 94B is shifted by the amount of difference between wavelength λ1 and wavelength λ2.

Calibration unit 116 then calibrates the measurement data output from light measurement unit 64, according to the difference between reference data 94A and measurement data 94B. More specifically, calibration unit 116 shifts the wavelength of the measurement data output from light measurement unit 64, by the amount of difference between wavelength λ1 and wavelength λ2. This eliminates the shift of wavelength.

Calibration unit 116 may perform a calibration process using reference data 84A (see FIG. 5) and measurement data 85 (see FIG. 5) described above, in place of reference data 94A and measurement data 94B.

Timing Chart

Referring to FIG. 8, the execution timing of a malfunction determination process will be described. FIG. 8 is a diagram illustrating temporal change of the magnitude of difference between reference data 84A (see FIG. 5) and measurement data 85 (see FIG. 5) and temporal change of the acceleration of optical measuring device 100.

FIG. 8 shows a graph 96A and a graph 96B. The horizontal axis of graph 96A represents time. The vertical axis of graph 96A represents the magnitude of difference between reference data 84A and measurement data 85. The magnitude of difference corresponds to, for example, a representative value of differential values included in the above-noted differential data 92 (see FIG. 5). As an example, the maximum value of the absolute values of the differential values included in differential data 92 is selected as a representative value.

Graph 96B corresponds to history information 84B (see FIG. 6) described above. The horizontal axis of graph 96B represents time. The vertical axis of graph 96B represents the acceleration of optical measuring device 100.

The malfunction determination process is started at any timing. The malfunction determination process is started at a timing when optical measuring device 100 is powered on. Alternatively, the malfunction determination process is started at a timing when optical measuring device 100 is powered off. Alternatively, the malfunction determination process is executed periodically.

At time T1, optical measuring device 100 starts a malfunction determination process. Since the representative value of differential data 92 at time T1 falls within range R1, the first malfunction condition is not satisfied. Therefore, optical measuring device 100 gives a notice that it is normal.

At time T2, optical measuring device 100 starts a malfunction determination process. Since the representative value of differential data 92 at time T2 falls within range R1, the first malfunction condition is not satisfied. Therefore, optical measuring device 100 gives a notice that it is normal.

At time T3, optical measuring device 100 starts a malfunction determination process. Since the representative value of differential data 92 at time T3 falls within range R1, the first malfunction condition is not satisfied. Therefore, optical measuring device 100 gives a notice that it is normal.

At time T4, optical measuring device 100 starts a malfunction determination process. Since the representative value of differential data 92 at time T4 falls outside range R1, the first malfunction condition is satisfied. Here, the representative value of differential data 92 falls within range R2, optical measuring device 100 determines that the degree of malfunction is small As a result, optical measuring device 100 executes the calibration process described above.

At time T5, optical measuring device 100 starts a malfunction determination process. Since the representative value of differential data 92 at time T5 falls within range R1, the measurement data has been calibrated to be normal through the calibration process at time T4. Optical measuring device 100 gives a notice that it is normal.

At time T6, optical measuring device 100 starts a malfunction determination process. Since the representative value of differential data 92 at time T6 falls outside range R1, the first malfunction condition is satisfied. Since the representative value of differential data 92 falls outside range R2 outside of range R1, optical measuring device 100 refers to history information 84B of acceleration to determine whether the second malfunction condition is satisfied. Here, preferably, optical measuring device 100 refers to accelerations detected from time T6 that is the timing of the present malfunction determination process to time T5 that is the timing of the previous malfunction determination process. The acceleration referred to falls outside range R4 at time TA. Therefore, optical measuring device 100 determines that the second malfunction condition is satisfied. Since both of the first malfunction condition and the second malfunction condition are satisfied, optical measuring device 100 notifies that repair is necessary. The user requests the manufacturer or the service sector to repair optical measuring device 100.

At time T7 after repair of optical measuring device 100, optical measuring device 100 starts a malfunction determination process. Since optical measuring device 100 has been repaired, the representative value of differential data 92 at time T7 falls within range R1. Optical measuring device 100 gives a notice that it is normal.

Control Structure of Optical Measuring Device 100

Figure 9:
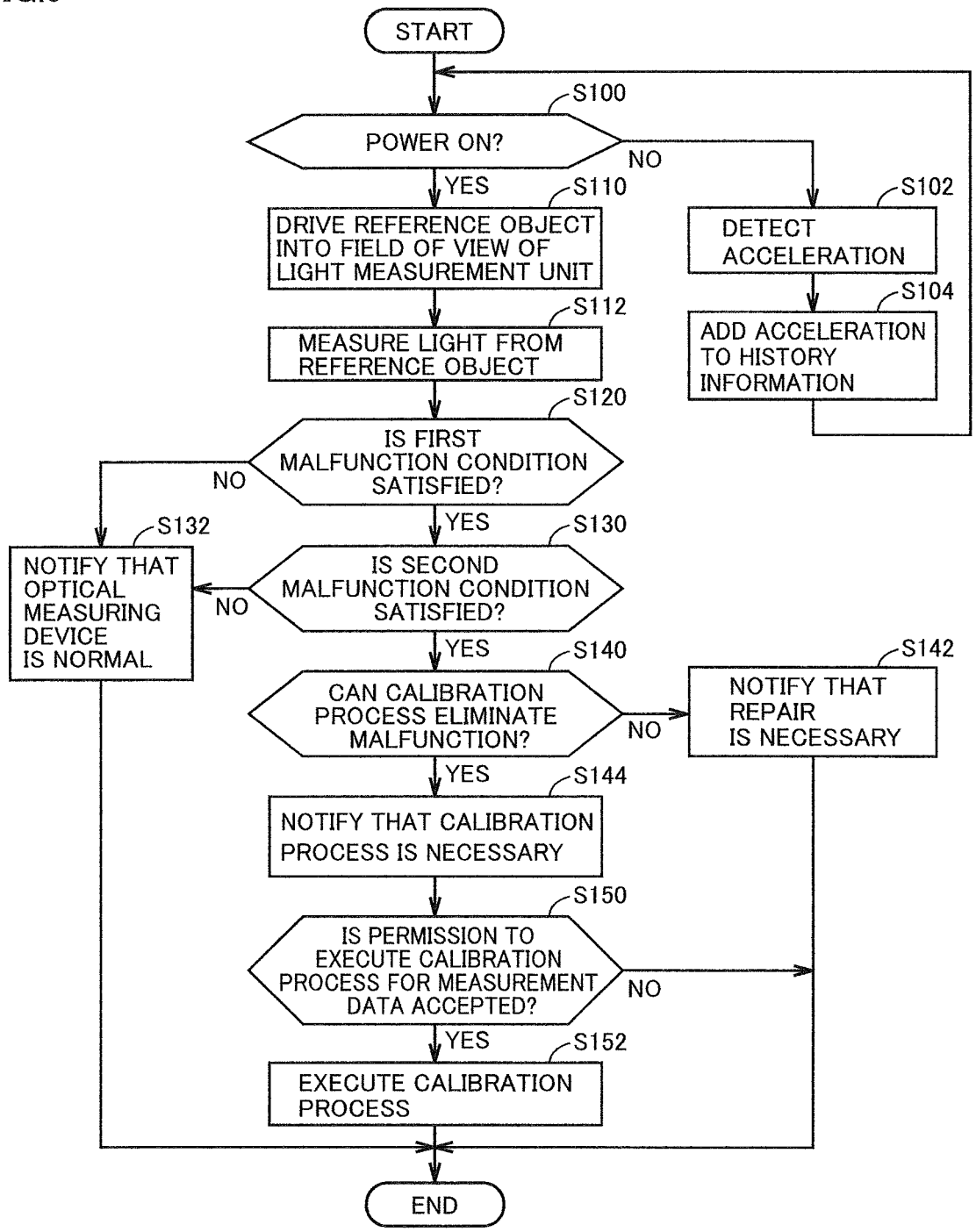
FIG. 9 is a flowchart of a malfunction determination process by the optical measuring device.

Referring to FIG. 9, the control structure of optical measuring device 100 will be described. FIG. 9 is a flowchart of a malfunction determination process of optical measuring device 100. The process in FIG. 9 is implemented by controller 101 (see FIG. 1) of optical measuring device 100 executing a program. In another aspect, part or all of the process may be executed by circuit elements or any other hardware.

In step S100, controller 101 determines whether optical measuring device 100 is powered on. If it is determined that optical measuring device 100 is powered on (YES in step S100), controller 101 switches the control to step S110. If not (NO in step S100), controller 101 switches the control to step S102.

In step S102, controller 101 sends a control signal to acceleration sensor 78 and detects the acceleration of optical measuring device 100.

In step S104, controller 101 associates the acceleration detected in step S102 with the detection time and adds these information to history information 84B (see FIG. 6). The acceleration detection time is specified, for example, by a clock function preinstalled in controller 101.

In step S110, controller 101 drives reference object 49 (see FIG. 1) into the field of view of light measurement unit 64 (see FIG. 1). Reference object 49 is driven by any mechanism. As an example, reference object 49 is driven by a plunger.

In step S112, controller 101 measures light from reference object 49. Measurement data 85 (see FIG. 5) is thus obtained.

In step S120, controller 101 serves as first determination unit 110 (see FIG. 1) to determine whether the first malfunction condition is satisfied. If it is determined that the first malfunction condition is satisfied (YES in step S120), controller 101 switches the control to step S130. If not (NO in step S120), controller 101 switches the control to step S132.

In step S130, controller 101 serves as second determination unit 112 (see FIG. 1) to determine whether the second malfunction condition is satisfied. If it is determined that the second malfunction condition is satisfied (YES in step S130), controller 101 switches the control to step S140. If not (NO in step S130), controller 101 switches the control to step S132. In step S132, controller 101 serves as output unit 114 (see FIG. 1) to give a notice that optical measuring device 100 is normal.

In step S140, controller 101 determines whether the malfunction of optical measuring device 100 can be eliminated by the calibration process. If it is determined that the malfunction of optical measuring device 100 can be eliminated by the calibration process (YES in step S140), controller 101 switches the control to step S144. If not (NO in step S140), controller 101 switches the control to step S142.

In step S142, controller 101 serves as output unit 114 to give a notice that optical measuring device 100 requires repair.

In step S144, controller 101 serves as output unit 114 to give a notice that a calibration process for measurement data is necessary.

In step S150, controller 101 determines whether a permission to execute a calibration process for the measurement data has been accepted. As an example, controller 101 displays a select screen including a permit button and a reject button on display unit 80. If the permit button is selected, controller 101 determines that execution of a calibration process has been permitted. If the reject button is selected, controller 101 determines that execution of a calibration process has been rejected. If it is determined that a permission to execute a calibration process for the measurement data has been accepted (YES in step S150), controller 101 switches the control to step S152. If not (NO in step S150), controller 101 terminates the malfunction determination process.

In step S152, controller 101 serves as calibration unit 116 to execute the calibration process described above.

BRIEF SUMMARY

As described above, optical measuring device 100 according to the present embodiment determines that optical measuring device 100 malfunctions when the first malfunction condition and the second malfunction condition are satisfied. With the first malfunction condition, it is determined whether measurement data 85 (see FIG. 5) deviates from reference data 84A (see FIG. 5). With the second malfunction condition, it is determined whether optical measuring device 100 received a significant shock in the past. Optical measuring device 100 can determine whether there is a malfunction more accurately than conventional examples by determining a malfunction based on both the first malfunction condition and the second malfunction condition.

Second Embodiment

Overview

In the first embodiment, the malfunction of optical measuring device 100 is determined by optical measuring device 100. By contrast, in a second embodiment, the malfunction of optical measuring device 100 is determined by a communication terminal 200 serving as a malfunction determination device. Except for this point, the configuration is the same as the first embodiment and will not be further elaborated below.

Malfunction Determination System 300

Figure 10:
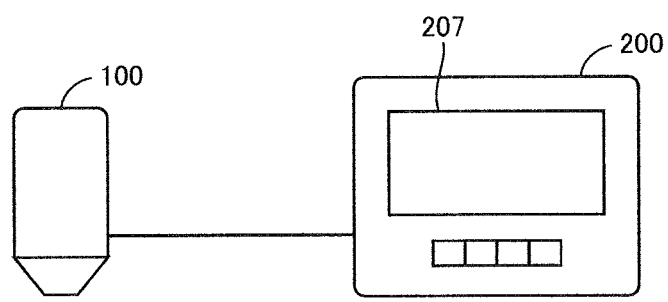
FIG. 10 is a diagram showing an exemplary system configuration of a malfunction determination system.
Figure 11:
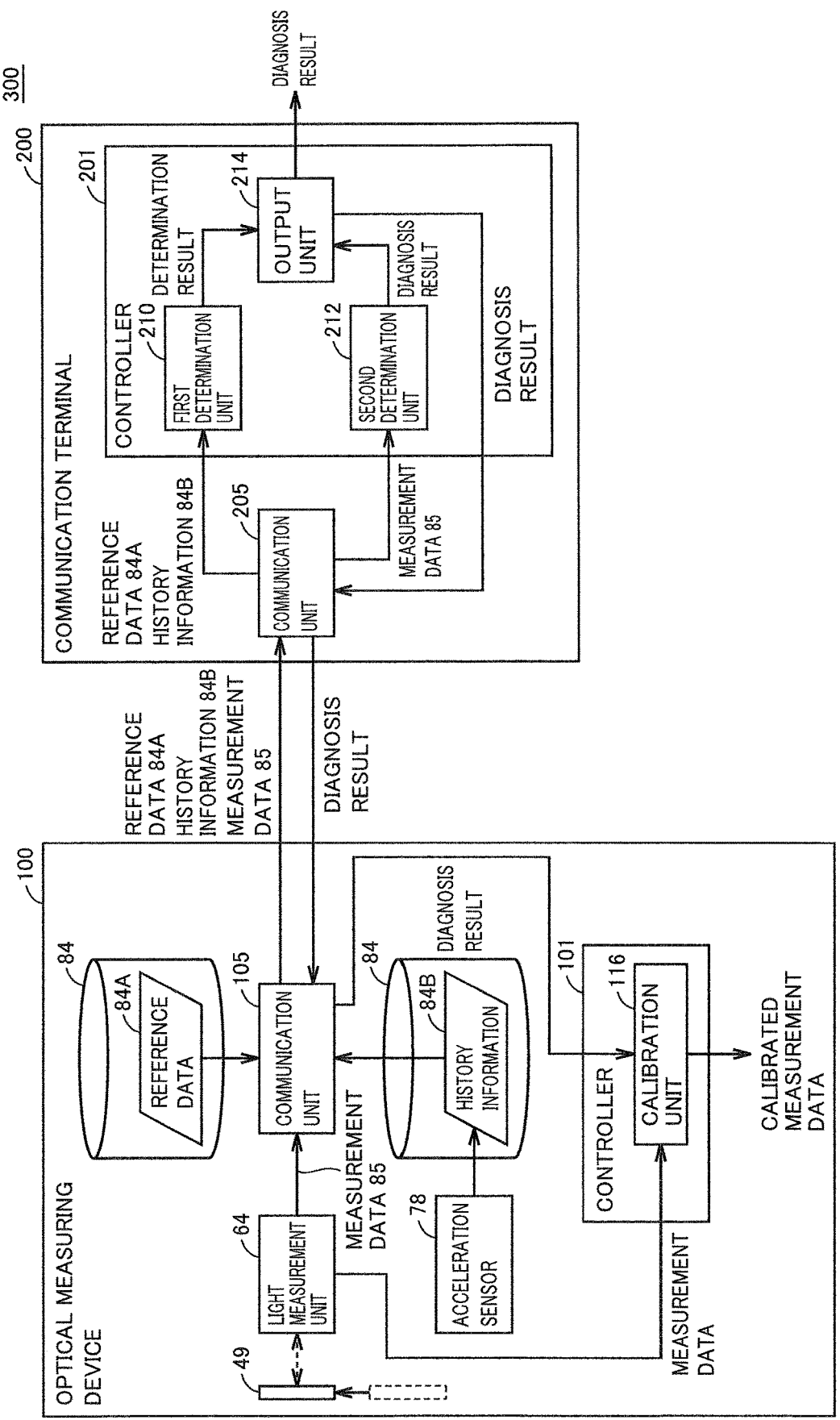
FIG. 11 is a diagram showing an exemplary configuration for implementing a malfunction determination process by the malfunction determination system.

Referring to FIG. 10 and FIG. 11, a malfunction determination system 300 in the second embodiment will be described. FIG. 10 is a diagram showing an exemplary system configuration of malfunction determination system 300. FIG. 11 is a diagram showing an exemplary configuration for implementing a malfunction determination process by malfunction determination system 300.

As shown in FIG. 10 and FIG. 11, malfunction determination system 300 includes optical measuring device 100 and communication terminal 200. Optical measuring device 100 and communication terminal 200 are connected to each other via a network. The communication between optical measuring device 100 and communication terminal 200 may be implemented by wireless communication or may be implemented by wired communication.

As shown in FIG. 11, optical measuring device 100 includes, as an example of the hardware configuration, a reference object 49, a light measurement unit 64, an acceleration sensor 78, a storage 84, a communication unit 105, and a controller 101. Controller 101 includes a calibration unit 116 as an example of the functional configuration.

Communication terminal 200 includes a controller 201 and a communication unit 205 as an example of the hardware configuration. Controller 201 is configured with, for example, at least one integrated circuit. The integrated circuit is configured with, for example, at least one CPU, at least one ASIC, at least one FPGA, or a combination thereof. Controller 201 includes a first determination unit 210, a second determination unit 212, and an output unit 214 as an example of the functional configuration.

In determining the malfunction of optical measuring device 100, the user connects optical measuring device 100 to communication terminal 200. Communication terminal 200 then establishes communication with optical measuring device 100. Subsequently, the user inputs an instruction to execute a malfunction determination process to communication terminal 200, and communication unit 205 in turn transmits a request for acquiring information to be used in the malfunction determination process to optical measuring device 100. Communication unit 205 is, for example, a communication interface (not shown).

When optical measuring device 100 receives a request for acquiring information from communication terminal 200, communication unit 105 (first communication unit) of optical measuring device 100 transmits reference data 84A, history information 84B, and measurement data 85 described above to communication terminal 200. Communication unit 105 is, for example, communication interface 90 (see FIG. 2) described above.

Communication unit 205 (second communication unit) of communication terminal 200 receives reference data 84A, history information 84B, and measurement data 85 from optical measuring device 100. Communication unit 205 outputs reference data 84A and measurement data 85 to first determination unit 210 and outputs history information 84B to second determination unit 212.

First determination unit 210 executes the same processing as in first determination unit 110 (see FIG. 1). That is, first determination unit 210 determines whether the result of comparison between reference data 84A and measurement data 85 satisfies the first malfunction condition.

Second determination unit 212 executes the same processing as in second determination unit 112 (see FIG. 1). That is, second determination unit 212 determines whether the magnitude of acceleration included in history information 84B satisfies the second malfunction condition.

Output unit 214 executes the same processing as in output unit 114 (see FIG. 1). That is, output unit 214 outputs that optical measuring device 100 malfunctions when first determination unit 210 determines that the first malfunction condition is satisfied and second determination unit 212 determines that the second malfunction condition is satisfied.

If the malfunction of optical measuring device 100 can be eliminated by the calibration process described above, communication unit 205 transmits a notice to that effect to optical measuring device 100. That is, when the magnitude of difference between reference data 84A and measurement data 85 falls outside range R1 (see FIG. 5) and within range R2 (see FIG. 5), communication unit 205 transmits, to optical measuring device 100, a notice that a calibration process for the measurement data output from light measurement unit 64 is necessary. Optical measuring device 100 receives the notice, and then calibration unit 116 executes the calibration process as described above.

Repair Process

When optical measuring device 100 requires repair, the user requests the manufacturer or the service sector to repair optical measuring device 100. The repairperson need to identify the cause of malfunction of optical measuring device 100 in order to repair optical measuring device 100. Here, the repairperson examines the use history of optical measuring device 100 to easily identify the cause of malfunction of optical measuring device 100.

Figure 12:
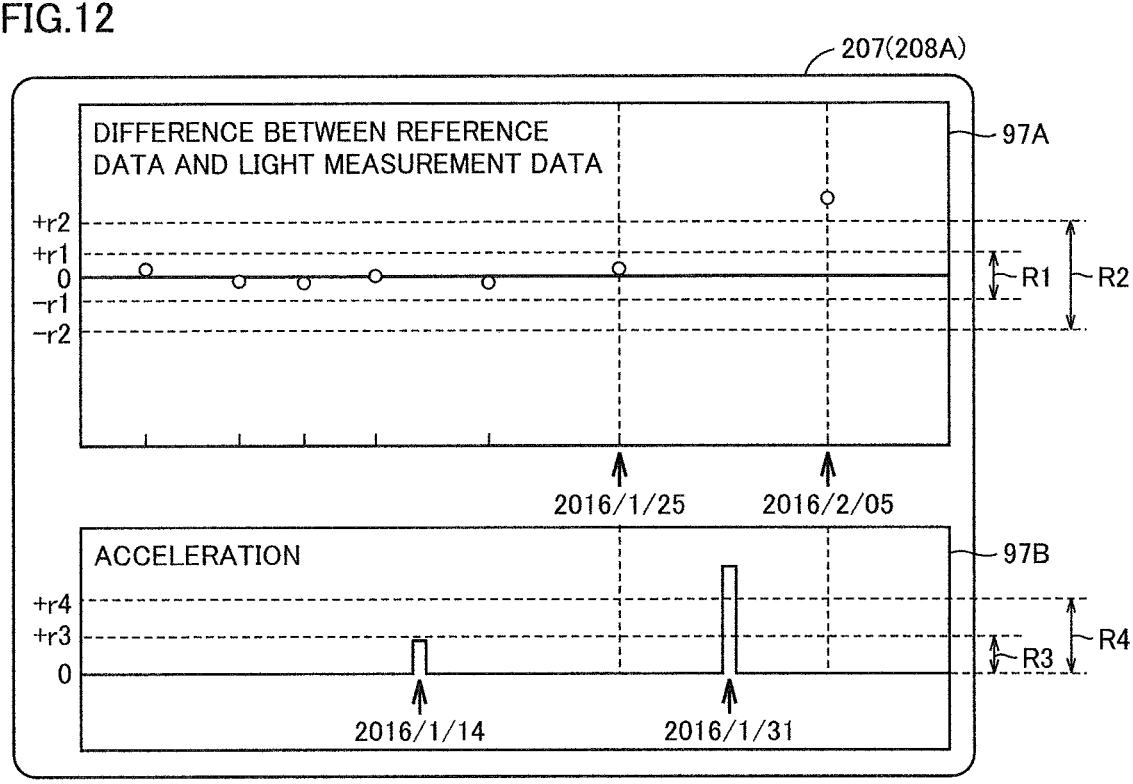
FIG. 12 is a diagram showing use history of the optical measuring device.

FIG. 12 is a diagram showing use history 208A of optical measuring device 100. Use history 208A appears on, for example, a display unit 207 of communication terminal 200. Use history 208A includes a graph 97A and a graph 97B. The horizontal axis of graph 97A represents time. The vertical axis of graph 97A indicates the magnitude of difference between reference data 84A and measurement data 85. The magnitude of difference is represented in chronological order. The horizontal axis of graph 97B represents time. The vertical axis of graph 97B represents the acceleration of optical measuring device 100. The acceleration is represented in chronological order.

The repair person can easily specify the cause of malfunction of optical measuring device 100 by examining use history 208A. As an example, the repairperson can examine graph 97A to identify that measurement data 85 deviates from reference data 84A. The repairperson also can examine graph 97B to identify that optical measuring device 100 received a significant shock in the past. As a result, the repairperson can estimate that the optical system in optical measuring device 100 is shifted. This reduces the time taken for repair and the steps of repair of optical measuring device 100.

Figure 13:
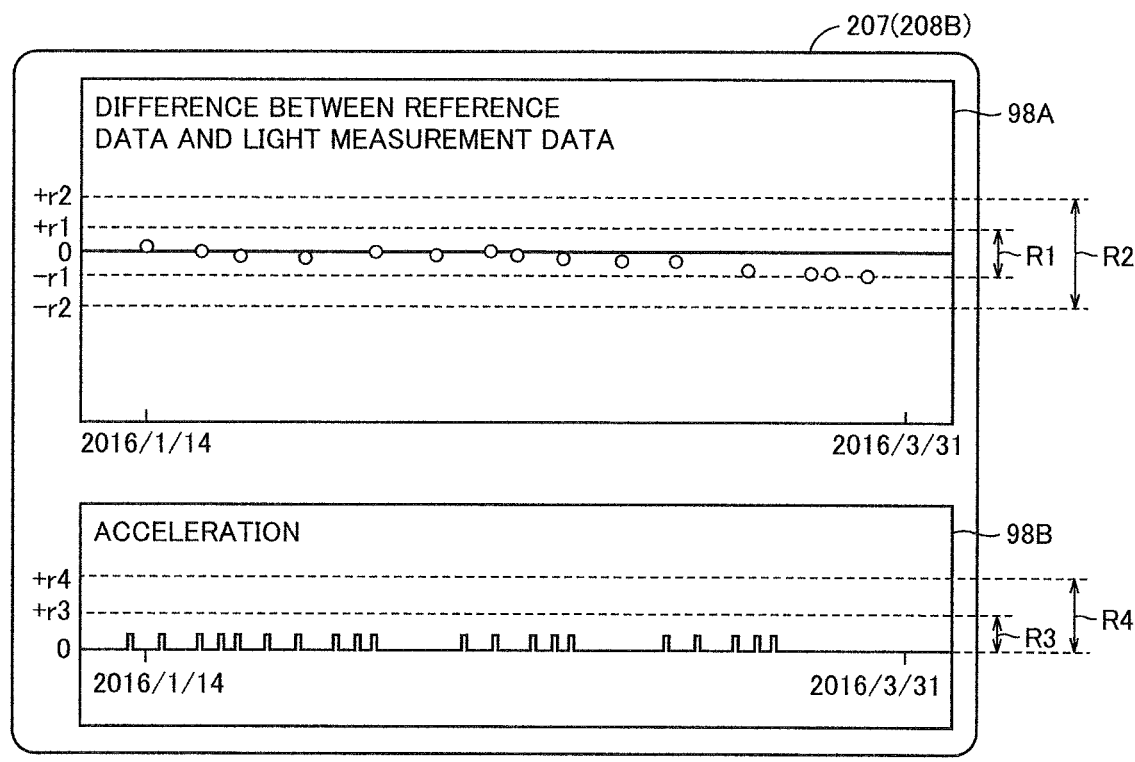
FIG. 13 is a diagram showing use history of the optical measuring device.

Another example of use history will be described. FIG. 13 is a diagram showing use history 208B of optical measuring device 100. Use history 208B includes a graph 98A and a graph 98B. The horizontal axis of graph 98A represents time. The vertical axis of graph 98A indicates the magnitude of difference between reference data 84A and measurement data 85. The magnitude of difference is represented in chronological order. The horizontal axis of graph 98B represents time. The vertical axis of graph 98B represents the acceleration of optical measuring device 100. The acceleration is represented in chronological order.

The repairperson can examine graph 98A to identify that measurement data 85 deviates from reference data 84A. The repairperson also can examine graph 98B to identify that optical measuring device 100 received a small shock many times in the past.

SUMMARY

An optical measuring device includes a light measurement unit, a sensor to detect the magnitude of vibration of the optical measuring device, a storage to store first measurement data obtained from the light measurement unit by measuring light from a reference object at a first timing and store the magnitude of vibration detected by the sensor as history information, a first determination unit configured to determine whether a result of comparison between second measurement data obtained from the light measurement unit by measuring light from the reference object at a second timing later than the first timing and the first measurement data satisfies a predetermined first condition, a second determination unit configured to determine whether the magnitude of vibration included in the history information satisfies a predetermined second condition, and an output unit configured to output that the optical measuring device malfunctions when the first determination unit determines that the first condition is satisfied and the second determination unit determines that the second condition is satisfied.

Preferably, the first condition is satisfied when the magnitude of difference between the first measurement data and the second measurement data falls outside a predetermined first range.

Preferably, the output unit outputs that a calibration process for measurement data output from the light measurement unit is necessary when the magnitude of difference falls outside the first range and within a predetermined second range outside of the first range, and outputs that the optical measuring device requires repair when the magnitude of difference falls outside the second range.

Preferably, the optical measuring device further includes a light source that emits light. The storage further stores third measurement data obtained from the light measurement unit by measuring the light at a third timing. The optical measuring device further includes a calibration unit configured to calibrate measurement data output from the light measurement unit in accordance with the magnitude of difference between fourth measurement data obtained from the light measurement unit by measuring the light at a fourth timing later than the third timing and the third measurement data when the magnitude of difference falls outside the first range and falls within the second range.

Preferably, the second condition is satisfied when the magnitude of vibration included in the history information falls outside a predetermined reference range.

Preferably, the second determination unit specifies the magnitude of vibration detected from the first timing to the second timing, from among the magnitudes of vibration defined in the history information, and determines that the second condition is satisfied when the specified magnitude of vibration falls outside the reference range.

Preferably, the second condition is satisfied when the sum of magnitudes of vibration included in the history information falls outside a predetermined reference range.

According to another aspect, a malfunction determination system includes an optical measuring device and a communication terminal capable of communicating with the optical measuring device. The optical measuring device includes a light measurement unit, a sensor to detect the magnitude of vibration of the optical measuring device, a storage to store first measurement data obtained from the light measurement unit by measuring light from a reference object at a first timing and store the magnitude of vibration detected by the sensor as history information, and a first communication interface to transmit second measurement data obtained from the light measurement unit by measuring light from the reference object at a second timing later than the first timing, the first measurement data, and the history information to the communication terminal. The communication terminal includes a second communication interface to receive the first measurement data, the second measurement data, and the history information, a first determination unit configured to determine whether the result of comparison between the first measurement data and the second measurement data satisfies a predetermined first condition, a second determination unit configured to determine whether the magnitude of vibration included in the history information satisfies a predetermined second condition, and an output unit configured to output that the optical measuring device malfunctions when the first determination unit determines that the first condition is satisfied and the second determination unit determines that the second condition is satisfied.

Preferably, the first condition is satisfied when the magnitude of difference between the first measurement data and the second measurement data falls outside a predetermined first range. The second communication interface outputs a notice to the optical measuring device to indicate that a calibration process for measurement data output from the light measurement unit is necessary when the magnitude of difference falls outside the first range and within a predetermined second range outside of the first range.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 49 reference object, 50 lens unit, 51 housing, 52, 54, 62, 70 lens, 56 driver, 58 half mirror, 60 light source, 64 light measurement unit, 65 opening, 66 diffraction grating, 68, 72 light-receiving sensor, 69 light-receiving element, 74 image processing unit, 76 circuit unit, 78 acceleration sensor, 80, 207 display unit, 82 operation unit, 84 storage, 84A, 94A reference data, 84B history information, 84C malfunction determination program, 85, 94B measurement data, 86 battery, 88 power source, 90 communication interface, 92 differential data, 96A, 96B, 97A, 97B, 98A, 98B graph, 100 optical measuring device, 101, 201 controller, 105, 205 communication unit, 110, 210 first determination unit, 112, 212 second determination unit, 114, 214 output unit, 116 calibration unit, 200 communication terminal, 208A, 208B use history, 300 malfunction determination system.

The invention claimed is:

1. An optical measuring device comprising:
a light measurer configured to output measurement data that represents a spectral characteristics of a measurement target;
a sensor to detect a magnitude of vibration of the optical measuring device;
a storage to store first measurement data obtained from the light measurer by measuring light from a reference object at a first timing and store the magnitude of vibration detected by the sensor as history information; and
a controller to control the optical measuring device;
wherein the controller:
determines whether a result of comparison between second measurement data obtained from the light measurer by measuring light from the reference object at a second timing later than the first timing and the first measurement data satisfies a predetermined first condition;
determines whether the magnitude of vibration included in the history information satisfies a predetermined second condition; and
outputs that the optical measuring device malfunctions when the controller determines that the first condition is satisfied and the controller determines that the second condition is satisfied.

2. The optical measuring device according to claim 1, wherein the first condition is satisfied when a magnitude of difference between the first measurement data and the second measurement data falls outside a predetermined first range.

3. The optical measuring device according to claim 2, wherein the controller
outputs that a calibration process for measurement data output from the light measurer is necessary when the magnitude of difference falls outside the first range and within a predetermined second range outside of the first range, and
outputs that the optical measuring device requires repair when the magnitude of difference falls outside the second range.

4. The optical measuring device according to claim 3, wherein
the optical measuring device further comprises a light source to emit light,
the storage further stores third measurement data obtained from the light measurer by measuring the light at a third timing, and
the controller calibrates measurement data output from the light measurer, in accordance with a magnitude of difference between fourth measurement data obtained from the light measurer by measuring the light at a fourth timing later than the third timing and the third measurement data, when the magnitude of difference falls outside the first range and within the second range.

5. The optical measuring device according to claim 1, wherein the second condition is satisfied when the magnitude of vibration included in the history information falls outside a predetermined reference range.

6. The optical measuring device according to claim 5, wherein the controller specifies a magnitude of vibration detected from the first timing to the second timing, from among magnitudes of vibration defined in the history information, and determines that the second condition is satisfied when the specified magnitude of vibration falls outside the reference range.

7. The optical measuring device according to claim 1, wherein the second condition is satisfied when a sum of magnitudes of vibration included in the history information falls outside a predetermined reference range.

8. The optical measuring device according to claim 1, wherein the light measurer comprises a light receiving sensor that outputs according to the light received.

9. The optical measuring device according to claim 8, wherein the light measurer further comprises a diffraction grating and outputs a signal representing the light intensity at each wavelength.

10. A malfunction determination system comprising:
an optical measuring device; and
a communication terminal capable of communicating with the optical measuring device,
the optical measuring device including
a light measurer configured to output measurement data that represents a spectral characteristics of a measurement target,
a sensor to detect a magnitude of vibration of the optical measuring device,
a storage to store first measurement data obtained from the light measurer by measuring light from a reference object at a first timing and store the magnitude of vibration detected by the sensor as history information, and
a first communication interface configured to transmit second measurement data obtained from the light measurer by measuring light from the reference object at a second timing later than the first timing, the first measurement data, and the history information to the communication terminal,
the communication terminal including
a second communication interface configured to receive the first measurement data, the second measurement data, and the history information, and
a controller to control the communication terminal;
wherein the controller
determines whether a result of comparison between the first measurement data and the second measurement data satisfies a predetermined first condition,
determines whether the magnitude of vibration included in the history information satisfies a predetermined second condition, and
outputs that the optical measuring device malfunctions when the controller determines that the first condition is satisfied and the controller determines that the second condition is satisfied.

11. The malfunction determination system according to claim 10, wherein
the first condition is satisfied when a magnitude of difference between the first measurement data and the second measurement data falls outside a predetermined first range, and
the second communication interface transmits a notice to the optical measuring device to indicate that a calibration process for measurement data output from the light measurer is necessary when the magnitude of difference falls outside the first range and within a predetermined second range outside of the first range.

12. The malfunction determination system according to claim 10, wherein the light measurer comprises a light receiving sensor that outputs according to the light received.

13. The malfunction determination system according to claim 12, wherein the light measurer further comprises a diffraction grating and outputs a signal representing the light intensity at each wavelength.

14. A malfunction determination method for an optical measuring device,
the optical measuring device comprising
a light measurer configured to output measurement data that represents a spectral characteristics of a measurement target,
a sensor to detect a magnitude of vibration of the optical measuring device, and
a storage to store first measurement data obtained from the light measurer by measuring light from a reference object at a first timing and store the magnitude of vibration detected by the sensor as history information,
the malfunction determination method comprising:
determining whether a result of comparison between second measurement data obtained from the light measurer by measuring light from the reference object at a second timing later than the first timing and the first measurement data satisfies a predetermined first condition;
determining whether the magnitude of vibration included in the history information satisfies a predetermined second condition; and
outputting that the optical measuring device malfunctions when the first condition is satisfied and the second condition is satisfied.

15. The malfunction determination method for an optical measuring device according to claim 14, wherein the light measurer comprises a light receiving sensor that outputs according to the light received.

16. The malfunction determination method for an optical measuring device according to claim 15, wherein the light measurer further comprises a diffraction grating and outputs a signal representing the light intensity at each wavelength.

17. A non-transitory recording medium storing a malfunction determination program for an optical measuring device,
the optical measuring device comprising
a light measurer configured to output measurement data that represents a spectral characteristics of a measurement target,
a sensor to detect a magnitude of vibration of the optical measuring device, and a storage to store first measurement data obtained from the light measurer by measuring light from a reference object at a first timing and store the magnitude of vibration detected by the sensor as history information, the malfunction determination program causing the optical measuring device to perform:

determining whether a result of comparison between second measurement data obtained from the light measurer by measuring light from the reference object at a second timing later than the first timing and the first measurement data satisfies a predetermined first condition;

determining whether the magnitude of vibration included in the history information satisfies a predetermined second condition; and outputting that the optical measuring device malfunctions when the first condition is satisfied and the second condition is satisfied.

18. The non-transitory recording medium storing a malfunction determination program for an optical measuring device according to claim 17, wherein the light measurer comprises a light receiving sensor that outputs according to the light received.

19. The non-transitory recording medium storing a malfunction determination program for an optical measuring device according to claim 18, wherein the light measurer further comprises a diffraction grating and outputs a signal representing the light intensity at each wavelength.

\* \* \* \* \*